(12) United States Patent
Bovee et al.

(10) Patent No.: US 10,990,630 B2
(45) Date of Patent: Apr. 27, 2021

(54) GENERATING SEARCH RESULTS BASED ON NON-LINGUISTIC TOKENS

(71) Applicant: INTERNATIONAL BUSINESS MACHINES CORPORATION, Armonk, NY (US)

(72) Inventors: Gregory Bovee, Great Falls, VA (US); Craig M. Trim, Sylmar, CA (US); Veronica Wyatt, Chicago, IL (US); Balachandra Deshpande, Northville, MI (US); Binoy Damodaran, Novi, MI (US); Mandar Mutalikdesai, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

(21) Appl. No.: 15/906,338

(22) Filed: Feb. 27, 2018

(65) Prior Publication Data

US 2019/0266251 A1 Aug. 29, 2019

(51) Int. Cl.
*G06F 16/33* (2019.01)
*G06F 40/289* (2020.01)
(Continued)

(52) U.S. Cl.
CPC .............. *G06F 16/93* (2019.01); *G06F 9/547* (2013.01); *G06F 16/2228* (2019.01);
(Continued)

(58) Field of Classification Search
CPC . G06F 9/547; G06F 40/00–58; G06F 16/3338
See application file for complete search history.

(56) References Cited

U.S. PATENT DOCUMENTS 7,519,588 B2   4/2009  Mason
7,844,594 B1 *  11/2010  Holt ..................... G06F 16/345
                                                 707/709

(Continued)

FOREIGN PATENT DOCUMENTS

EP          2124173        11/2009

OTHER PUBLICATIONS

Moore, "A Real-time N-gram Approach to Choosing Synonyms Bases on Context", Electronic Thesis and Dissertation Repository, 2015, 12 pages.

(Continued)

*Primary Examiner* — Robert W Beausoleil, Jr.
*Assistant Examiner* — Nirav K Khakhar
(74) *Attorney, Agent, or Firm* — James Nock; Andrew D. Wright; Roberts Calderon Safran & Cole, P.C.

(57) ABSTRACT

Systems and methods for generating search results based on non-linguistic tokens are disclosed. In embodiments, a computer-implemented method comprises: mapping, by a computing device, a non-linguistic token to documents during indexing based on associations in a token database between the non-linguistic token and variations of a multi-word term; receiving, by the computing device, the multi-word term in a search query; determining, by the computing device, the non-linguistic token associated with the multi-word term using the token database; and generating, by the computing device, search results based on the multi-word term and the non-linguistic token.

19 Claims, 5 Drawing Sheets

(51) Int. Cl.
  *G06F 16/93* (2019.01)
  *G06F 9/54* (2006.01)
  *G06F 16/22* (2019.01)
  *G06F 16/2457* (2019.01)

(52) U.S. Cl.
  CPC .... *G06F 16/24578* (2019.01); *G06F 16/3335* (2019.01); *G06F 16/3338* (2019.01); *G06F 40/289* (2020.01)

(56) References Cited

U.S. PATENT DOCUMENTS

| | | | |
|---|---|---|---|
| 7,925,498 | B1 | 4/2011 | Baker et al. |
| 9,135,308 | B2 | 9/2015 | Bhalotia |
| 9,280,536 | B2 | 3/2016 | Sayers et al. |
| 9,519,706 | B2* | 12/2016 | Luke ............... G06F 40/284 |
| 10,380,248 | B1* | 8/2019 | Lai ................. G06F 40/284 |
| 2006/0036593 | A1* | 2/2006 | Dean ................ G06F 16/951 |
| 2006/0173821 | A1* | 8/2006 | Hennum .......... G06F 40/205 |
| 2007/0276820 | A1* | 11/2007 | Iqbal .............. G06F 16/338 |
| 2009/0210828 | A1* | 8/2009 | Kahn ................ G06F 16/93 |
| | | | 715/854 |
| 2012/0290288 | A1 | 11/2012 | Ait-Mokhtar |
| 2014/0344263 | A1 | 11/2014 | Dhamdhere et al. |
| 2014/0379324 | A1 | 12/2014 | Klapaftis et al. |
| 2015/0309989 | A1* | 10/2015 | Brav ............... G06F 40/284 |
| | | | 704/9 |
| 2019/0102400 | A1* | 4/2019 | Kumaran ......... G10L 15/1815 |

OTHER PUBLICATIONS

Taghva et al. "Recognizing acronyms and their definitions", International Journal on Document Analysis and Recognition, Sep. 8, 1998, 8 pages.

* cited by examiner (watson_text:instrument watson_text:ipc watson_text:modul watson_text:modul watson_text:modul)
(watson_text:panel watson_text:instrument watson_text:instrument watson_text:instrument)
(watson_text:cluster watson_text:panel watson_text:panel watson_text:panel) (watson_text:cl
watson_text:cluster watson_text:cluster) (watson_text:noisi watson_text:instrument watson_text:ipc
watson_text:buzz watson_text:nois watson_text:nois watson_text:rattl watson_text:rattl
watson_text:squeak watson_text:squeak) watson_text:panel watson_text:cluster
(5)spanNear([spanOr([watson_text:instrument, watson_text:ipc^0.8, watson_text:modul^0.8,
watson_text:modul^0.8, watson_text:modul^0.8]), spanOr([watson_text:panel,
watson_text:instrument^0.8, watson_text:instrument^0.8, watson_text:instrument^0.8])], 3, false)
spanNear([spanOr([watson_text:panel, watson_text:instrument^0.8, watson_text:instrument^0.8,
watson_text:instrument^0.8]), spanOr([watson_text:cluster, watson_text:panel^0.8,
watson_text:panel^0.8, watson_text:panel^0.8])], 3, false) spanNear([spanOr([watson_text:cluster,
watson_text:panel^0.8, watson_text:panel^0.8, watson_text:panel^0.8]), spanOr([watson_text:cl,
watson_text:cluster^0.8, watson_text:cluster^0.8])], 3, false) spanNear([spanOr([watson_text:cl,
watson_text:cluster^0.8, watson_text:cluster^0.8]), spanOr([watson_text:noisi,
watson_text:instrument^0.8, watson_text:ipc^0.8, watson_text:buzz^0.8, watson_text:nois^0.8,
watson_text:nois^0.8, watson_text:rattl^0.8, watson_text:rattl^0.8, watson_text:squeak^0.8,
watson_text:squeak^0.8])], 3, false) spanNear([spanOr([watson_text:noisi, watson_text:instrument^0.8,
watson_text:ipc^0.8, watson_text:buzz^0.8, watson_text:nois^0.8, watson_text:nois^0.8,
watson_text:rattl^0.8, watson_text:rattl^0.8, watson_text:squeak^0.8, watson_text:squeak^0.8]),
watson_text:panel], 3, false) spanNear([watson_text:panel, watson_text:cluster], 3, false)
(6)spanNear([spanOr([watson_text:instrument, watson_text:ipc^0.8, watson_text:modul^0.8,
watson_text:modul^0.8, watson_text:modul^0.8]), spanOr([watson_text:cluster, watson_text:panel^0.8,
watson_text:panel^0.8, watson_text:panel^0.8])], 5, false) spanNear([spanOr([watson_text:panel,
watson_text:instrument^0.8, watson_text:instrument^0.8, watson_text:instrument^0.8]),
spanOr([watson_text:cl, watson_text:cluster^0.8, watson_text:cluster^0.8])], 5, false)
spanNear([spanOr([watson_text:cluster, watson_text:panel^0.8, watson_text:panel^0.8,
watson_text:panel^0.8]), spanOr([watson_text:noisi, watson_text:instrument^0.8, watson_text:ipc^0.8,
watson_text:buzz^0.8, watson_text:nois^0.8, watson_text:nois^0.8, watson_text:rattl^0.8,
watson_text:rattl^0.8, watson_text:squeak^0.8, watson_text:squeak^0.8])], 5, false)
spanNear([spanOr([watson_text:cl, watson_text:cluster^0.8, watson_text:cluster^0.8]),
watson_text:panel], 5, false) spanNear([spanOr([watson_text:noisi, watson_text:instrument^0.8,
watson_text:ipc^0.8, watson_text:buzz^0.8, watson_text:nois^0.8, watson_text:nois^0.8,
watson_text:rattl^0.8, watson_text:rattl^0.8, watson_text:squeak^0.8, watson_text:squeak^0.8]),
watson_text:cluster], 5, false) (7)spanNear([spanOr([watson_text:instrument, watson_text:ipc^0.8,
watson_text:modul^0.8, watson_text:modul^0.8, watson_text:modul^0.8]), spanOr([watson_text:panel,
watson_text:instrument^0.8, watson_text:instrument^0.8, watson_text:instrument^0.8])], 8, false)
spanNear([spanOr([watson_text:panel, watson_text:instrument^0.8, watson_text:instrument^0.8,
watson_text:instrument^0.8]), spanOr([watson_text:cluster, watson_text:panel^0.8,
watson_text:panel^0.8, watson_text:panel^0.8])], 8, false) spanNear([spanOr([watson_text:cluster,
watson_text:panel^0.8, watson_text:panel^0.8, watson_text:panel^0.8]), spanOr([watson_text:cl,
watson_text:cluster^0.8, watson_text:cluster^0.8])], 8, false) spanNear([spanOr([watson_text:cl,
watson_text:cluster^0.8, watson_text:cluster^0.8]), spanOr([watson_text:noisi,
watson_text:instrument^0.8, watson_text:ipc^0.8, watson_text:buzz^0.8, watson_text:nois^0.8,
watson_text:nois^0.8, watson_text:rattl^0.8, watson_text:rattl^0.8, watson_text:squeak^0.8,
watson_text:squeak^0.8])], 8, false) spanNear([spanOr([watson_text:noisi, watson_text:instrument^0.8,
watson_text:ipc^0.8, watson_text:buzz^0.8, watson_text:nois^0.8, watson_text:nois^0.8,
watson_text:rattl^0.8, watson_text:rattl^0.8, watson_text:squeak^0.8, watson_text:squeak^0.8]),
watson_text:panel], 8, false) spanNear([watson_text:panel, watson_text:cluster], 8, false)

FIG. 4

GENERATING SEARCH RESULTS BASED ON NON-LINGUISTIC TOKENS

BACKGROUND

The present invention relates generally to linguistic processing arts and, more particularly, to search engines with synonym expansion utilizing non-linguistic tokens.

Search engines are increasingly utilized by people in both personal and professional contexts as a means for obtaining desired content. Search engines include programing to identify content or items in one or more databases that correspond to keywords or characters specified by a user. An enterprise search is one type of search wherein content from multiple enterprise-type sources, such as databases and intranets, are searchable by a defined audience. One example of an enterprise search engine is the Solr open source enterprise search platform that uses Apache Lucene™ Application Programming Interface (API) for full-text indexing and searching. Certain systems also utilizes Solr with a custom query builder and ranking algorithms to score semantic relationships between a given query and a Solr document.

Typically, enterprise search systems index data and documents from a variety of sources. During indexing, content from a plurality of sources is processed and saved in an index, which is optimized for quick lookups without storing the full text of the document. As part of the processing, tokenization is applied to split the content into tokens, which are the basic matching unit in a search. In use, a user search query is compared to the stored index, and the search system return results or "hits" referencing source documents that match.

Typically when an enterprise engine searches documents for matches to a compound query (i.e., a multi-word term), the query is parsed into stemmed tokens and the search performs a disjunctive search expression among each term. Thus, documents which match any of the search terms are considered matches. Typically, matching more terms is scored better than matching fewer, but the default search does not consider proximity or sequence among the terms. For example, a search from the query "Exhaust Gas Recirculation system is inop" gets processed as a disjunctive OR query for: text:exhaust text:ga text:recircul text:system text: inop. Therefore, documents which contain these terms (i.e., exhaust, ga, recircul, system, inop), in any context, are matched.

SUMMARY

In an aspect of the invention, a computer-implemented method for generating search results based on non-linguistic tokens includes: mapping, by a computing device, a non-linguistic token to documents during indexing based on associations in a token database between the non-linguistic token and variations of a multi-word term; receiving, by the computing device, the multi-word term in a search query; determining, by the computing device, the non-linguistic token associated with the multi-word term using the token database; and generating, by the computing device, search results based on the multi-word term and the non-linguistic token.

In another aspect of the invention, there is a computer program product for generating search results based on non-linguistic tokens. The computer program product comprises a computer readable storage medium having program instructions embodied therewith. The program instructions are executable by a computing device to cause the computing device to: map a plurality of non-linguistic tokens to a plurality of documents during indexing based on associations in a token database between the plurality of non-linguistic tokens and variations of search terms; receive a search query comprising one or more original search terms including at least one multi-word term; determine one or more non-linguistic tokens of the plurality of non-linguistic tokens associated with the one or more original search terms using the token database; perform pairwise expansion of the search query to generate an expanded search query containing only the one or more original search terms and the determined one or more non-linguistic tokens; and generate search results based on the expanded search query.

In another aspect of the invention, there is a system for generating search results based on non-linguistic tokens. The system includes a CPU, a computer readable memory and a computer readable storage medium associated with a computing device; program instructions to copy a plurality of non-linguistic tokens into respective keyword fields of a plurality of documents prior to indexing of the plurality of documents; program instructions to map the plurality of non-linguistic tokens to the plurality of documents during indexing based on associations in a token database between the plurality of non-linguistic tokens and variations of search terms located in the plurality of documents; program instructions to receive a search query comprising one or more original search terms; program instructions to determine one or more non-linguistic tokens associated with the one or more original search terms using the token database; program instructions to perform pairwise expansion of the search query to generate an expanded search query containing the one or more original search terms and the determined one or more non-linguistic tokens, wherein the expanded search query does not contain variations of the one or more original search terms; and program instructions to generate search results based on only the expanded search query, wherein the search results comprise matching documents that include one or more of the plurality of documents containing the one or more non-linguistic tokens, and wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 4 illustrates search results generated during a conventional query-time synonym expansion.

DETAILED DESCRIPTION

Figure 1:
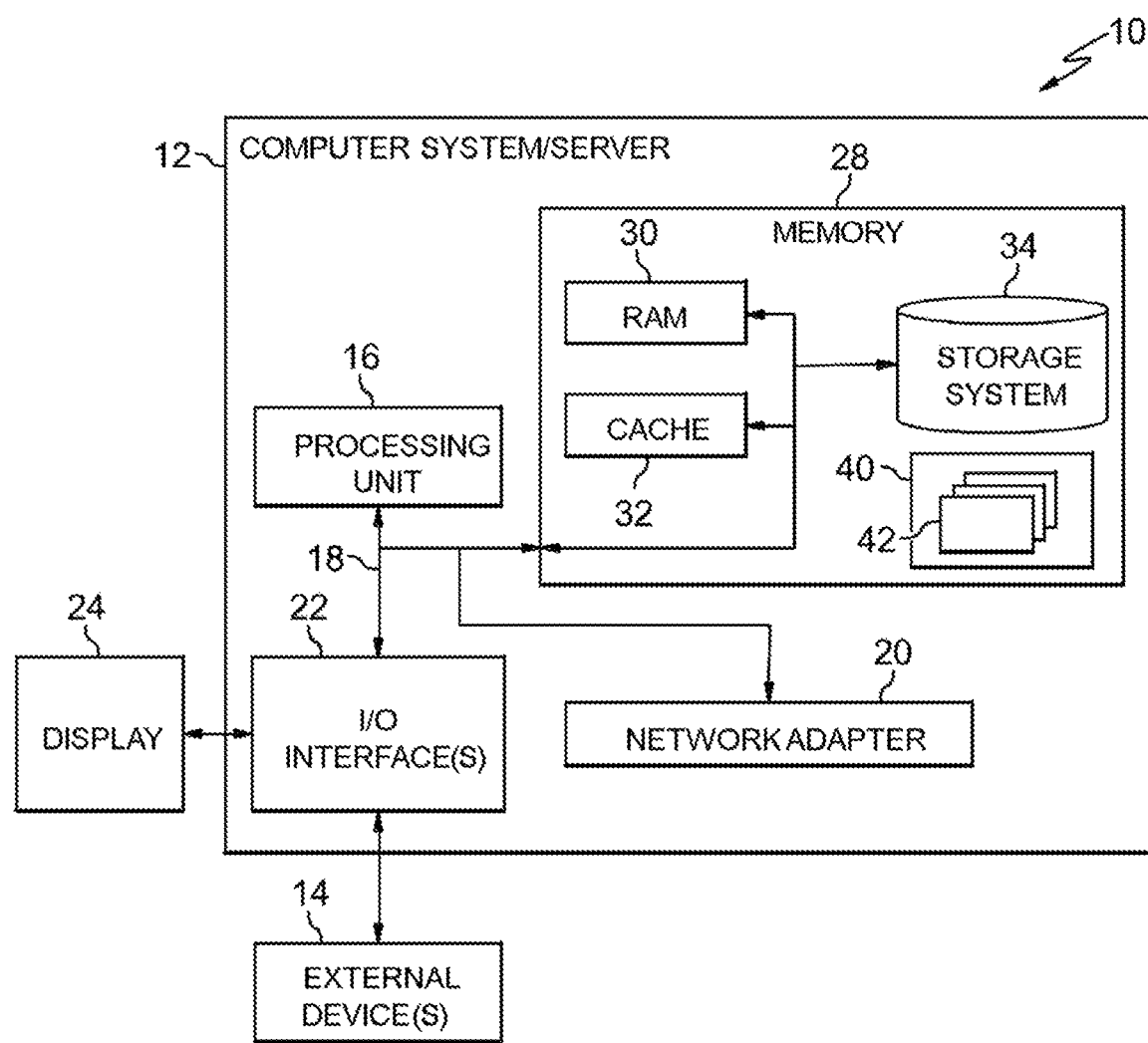
FIG. 1 depicts a computing infrastructure according to an embodiment of the present invention.

The present invention relates generally to linguistic processing arts, and more particularly to search engines (e.g., enterprise search engines) with synonym expansion utilizing non-linguistic tokens. In embodiments, an enterprise search engine system maps synonyms to a non-linguistic token (e.g., an acronym) to reduce the number of queries, and thus matches, for a given term, be it a compound word or phrase or a single word. In embodiments, the system enables mapping of a highly compound word or a multi-word term to a single non-linguistic token, which is very unlikely to cause unintended search matches. For example, a search engine system of the present invention may associate the compound term "instrument panel cluster" with the non-linguistic token "ipc". In aspects, the system also enables mapping of the search indexes using the same non-linguistic token pairing (i.e., the compound word and non-linguistic acronym token). Thus, embodiments of the invention enable a search system to map a non-linguistic token to a multi-word term and its associated synonyms during creation of a search index; receive the multi-word term in a search query; match the multi-word term to the associated non-linguistic token; and search the index for documents including matches to the multi-word term or the associated non-linguistic token, thereby retrieving matches containing synonyms associated with the non-linguistic token.

Most existing search engines support synonym recognition. Using this capability requires the import of synonyms either during the document indexing (in which case documents are indexed under both the native words and the synonym words) or during document query (in which case the query string is augmented with synonyms). In general, there are two forms of synonym expansion: query-time expansion and index-time expansion. The term query-time expansion as used herein refers to the evaluation of a user's search query input and the expansion of the search query to match additional documents by searching for synonyms or variations of the search query terms (query input). The term index-time expansion as used herein refers to the expansion of the search query to match additional documents by indexing documents to include recognized synonyms or variations of the search query terms. Index-time synonym augmentation or synonym expansion only supports the expansion format. Query-time synonym augmentation or synonym expansion can be either of the form where words are fully substituted by their synonym or can be augmented with an expansion to all possible synonyms. Synonym substitution may be indicated in a synonym file using the convention: "imp=>inoperable". Synonym expansion may be indicated in a synonym file using the convention: "Inop, inoperable, fails, not working".

While neither form of synonym expansion is supported by typical enterprise search engines, both forms of synonym expansion can be enabled through minor edits to the Solr schema.xml. The addition for index-time expansion is generally: <filter class="solr.SynonymFilterFactory" synonyms="index_synonyms.txt" ignoreCase="true" expand="true"/>. The addition for Query-time expansion is generally: <filter class="solr.SynonymFilterFactory" synonyms="synonyms.txt" ignoreCase="true" expand="true"/>.

When synonym expansion is activated, particularly with a query including compound words, the expansion of matchable terms can be extensive. For example, applying the synonym expansion "buzz, noise, noises, noisy, rattle, rattles, squeak, squeaks" to the query "Exhaust Gas Recirculation system is noisy" results in the Solr search: text: exhaust text:ga text:recircul text:system (text:noisi text: buzz text:nois text: no is text:rattl text:squeak text:squeak). Thus, it can be seen that such synonym expansion functions result in searches for documents matching any of the individual synonymous terms.

Typical enterprise search engine systems do not all recognize compound concepts (i.e., multi-word terms) as entities, nor do they all recognize synonyms and misspellings. Typical enterprise search engine systems utilizing synonym expansion techniques that rely on matching each individual search query term with its synonyms, which can result in an undesirable expansion of search results. Such an explosion of terms during a search becomes particularly troublesome when deployed in real-life with thousands of different documents to search, as well as thousands of important terms and synonyms to consider. Unmanaged synonym expansion can result in the return of inexplicable matches which quickly become the unfortunate focal point of the search endeavor. Embodiments of the invention provide an improved search engine system which enables better matching of documents across synonyms, abbreviations and misspellings, without magnifying the contamination of search results with documents which result from partial phrase matches. In other words, embodiments of the invention provide improved synonym expansion techniques to eliminate the technical problem of unintended propagation of synonyms during conventional query-time synonym expansion or conventional index-time synonym expansion. More details regarding the technical solutions provided by embodiments of the invention are provided below.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
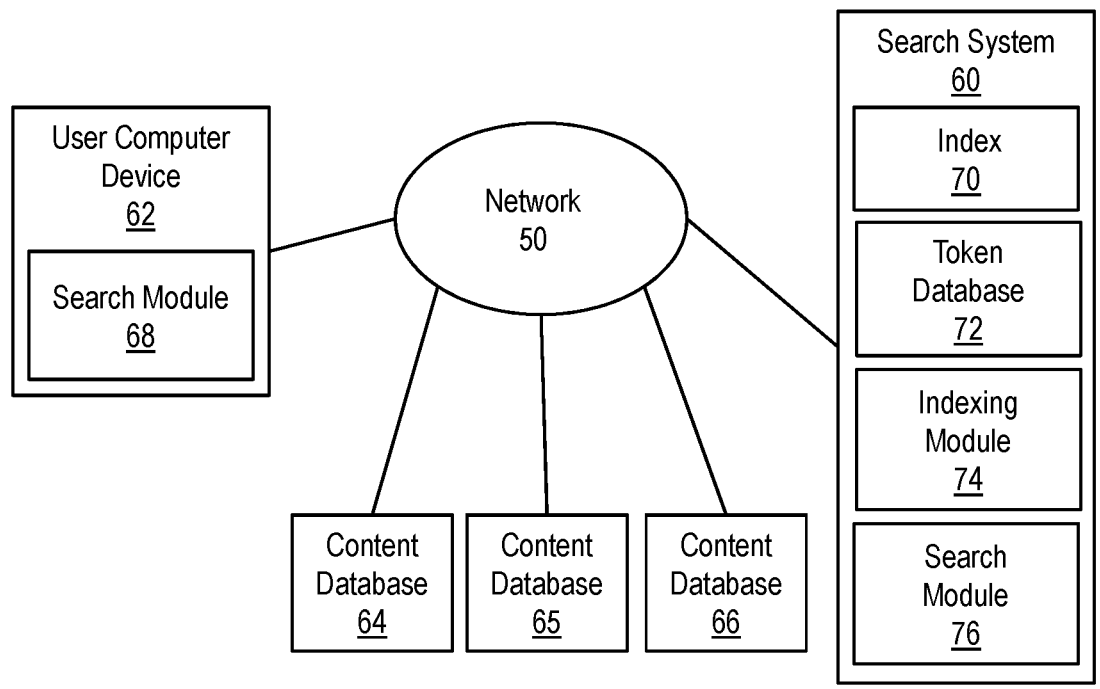
FIG. 2 shows an exemplary environment in accordance with aspects of the invention.

FIG. 2 shows an exemplary environment in accordance with aspects of the invention. The environment includes a network 50 interconnecting a search engine system (hereafter search system) 60 with one or more user computer devices represented at 62 and one or more content databases or document repositories indicated at 64-66. The search system 60 may comprise a computer system 12 of FIG. 1, and may be connected to the network 50 via the network adapter 20 of FIG. 1. The search system 60 may be configured as a special purpose computing device that is part of an enterprise search engine infrastructure. For example, the search system 60 may be configured to receive a search query generated by a search module 68 of the user computer device 62, coordinate the execution of search query, and format the result of the search query into results returned to the user computer device 62.

The execution of a search query by the search system 60 may include, for example, sending queries to one or more search indices indicated at 70, computing ranks of the results, and retrieving results or a summary for each result. The search system 60 includes or is in communication with a token database 72 storing matches between terms (including multi-word terms and their synonyms and/or variations) and non-linguistic tokens. The term "non-linguistic token" as used herein refers to a basic matching unit for searching purposes which is not a recognized word. A non-linguistic token may be a standard or non-standard acronym for a multi-word term, or a series of letters, symbols or numbers associated with the multi-word term, for example. In one example, the multi-word term "instrument panel cluster" is associated with the non-linguistic token "ipc".

In aspects, the non-linguistic token of the present invention refers to a token which is separate and distinct from variations (e.g., synonyms) of a search term. For example, while an acronym of a multi-word term may be recognized as a variation of that term, only a non-linguistic token of the present invention is associated with the multi-word term in a token database (a sole token is associated with the term). This is distinguished from a database of term variations (e.g., synonyms), which would include all variations, misspellings, acronyms, etc. associated with a particular term. Moreover, in accordance with embodiments of the invention, only non-linguistic tokens are utilized to map to a multi-word term and its variations during indexing. Accordingly, the index 70 of the present invention associates only a single non-linguistic token to a search term, not a plurality of variations of the search term. Moreover, in embodiments of the invention, an acronym utilized as a non-linguistic token is one created by the search system 60, and is not a recognized variation of a search term.

The network 50 may be any suitable communication network or combination of networks, such as a local area network (LAN), a general wide area network (WAN), and/or a public network (e.g., the Internet). The user computer device 62 may include elements of the computing system 12, and may be a desktop computer, laptop computer, tablet computer, smartphone, etc. In embodiments, the user computer device 62 runs an application program (e.g., via the search module 68) that provides an interface by which a user may enter (e.g., type) a search query to be submitted to the search system 60 via the network 50. The search system 60 may be configured to communicate with plural different user computer devices 62 simultaneously, and perform search functions separately for each user computer device 62 independent of the others. In other embodiments, the search system 60 runs an application program that provides an interface by which a user may enter a search query using the search system 60 itself.

Still referring to FIG. 2, an indexing module 74 of the search system 60 may include one or more program modules (e.g., program module 42 of FIG. 1) executed by the search system 60, and may be configured to perform one or more of the functions described herein. In embodiments, the indexing module 74 is configured to map non-linguistic tokens to terms during indexing of one or more documents from one or more of the content databases 64-66. In aspects, existing indexing methods and tools may be utilized by the indexing module 74 in conjunction with the mapping of non-linguistic tokens to create the index 70. In aspects, when a document is loaded to the search system 60 during indexing, synonyms associated with a particular non-linguistic token are found and mapped to the non-linguistic token utilizing an existing indexing method. In one example, documents including synonyms associated with a particular non-linguistic token are modified during indexing to include the associated non-linguistic token.

With continued reference to FIG. 2, a search module 76 of the search system 60 may include or more program modules (e.g., program module 42 of FIG. 1) executed by the search system 60 and may be configured to perform one or more of the functions described herein. In embodiments, the search module 76 is configured to perform search functions to return search results in response to a user's search query. In aspects, the search module 76 is an enterprise search module configured to return search results based on a variety of sources (e.g., content databases 64-66) which may include file systems, intranets, document management systems, email and databases. In aspects, the search module 76 is configured to search the token database 72 for non-linguistic token matches to query term(s) receive from a user; create an expanded search query comprised of original query terms and associated non-linguistic token matches; conduct a pairwise search for the query terms and the associated non-linguistic tokens utilizing the index 70; and return results to the user computer device 62. In aspects, existing search methods and tools may be utilized by the search module 76 to provide results to a user based on the expanded search query of the present invention.

In embodiments, the search system 60 may include additional or fewer components than those shown in FIG. 2. In embodiments, separate components may be integrated into a single computing component or module. Additionally, or alternatively, a single component may be implemented as multiple computing components or modules, or across multiple computing devices. For example, the indexing module 74 and search module 76 of the invention may be implemented by computing devices separate from, but in communication with, other components of the search system 60. Moreover, the quantity of devices and/or networks in the environment of FIG. 2 is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
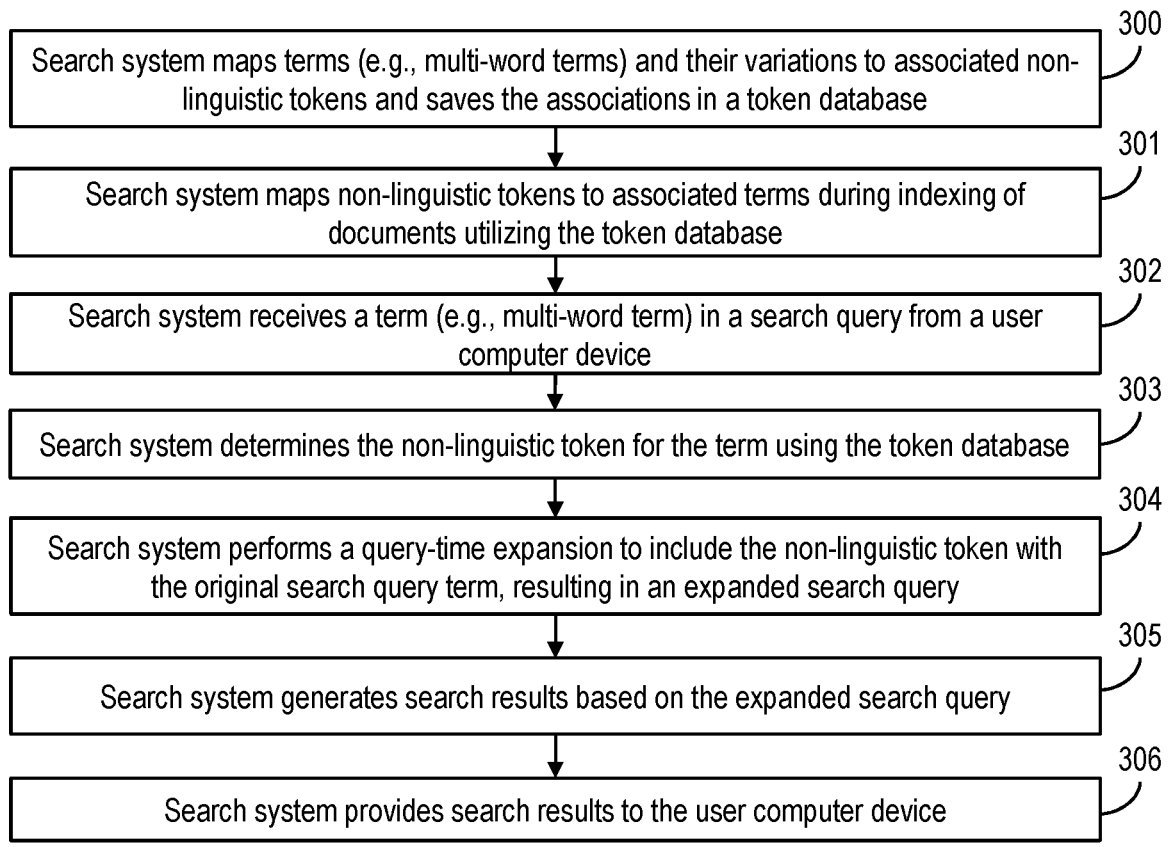
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300 search system 60 maps terms (single word or multi-word terms) to associated non-linguistic tokens and saves the associations in the token database 72. In aspects, the search system 60 maps each term and its associated variations with a non-linguistic token. Henceforth, the term "variation" as used herein refers to a variation of a term (e.g., a synonym, abbreviation, misspelling or alternative spelling) which is recognized by the search system 60, through cognitive learning of the search system 60, by accessing a database of predetermined variations, or both. By way of example, the search system 60 may recognize that the multi-word term "instrument panel cluster" has the following recognized variations: "module instrument panel cl"; "module instrument panel cluster"; "instrument panel cluster"; and "module instrument panel cluster ipc". In this example, the search system 60 maps the non-linguistic token "ipc" to the term "instrument panel cluster" and to each of its recognized variations.

The search system 60 may associate or map terms with non-linguistic tokens utilizing automated or manual processes. For example, linguistic processing software of the search system 60 may designate a recognized acronym of a term (e.g., an acronym typically utilized in conjunction with the term) as its associated non-linguistic token. Alternatively, the search system 60 may generate a non-linguistic token for a term which is a non-standard acronym; series of letters, number, or symbols; or any non-linguistic combination of letters, numbers and/or symbols. In aspects, the search system 60 may automatically generate a non-linguistic token for a multi-word term utilizing the first letter of each word of a multi-word term, or other algorithm to auto-generate or create a non-linguistic token. In one example, the search system 60 automatically generates the non-linguistic token "ipc" utilizing the first letter in each word of the multi-word term "instrument panel cluster".

At step 301, the search system 60 maps non-linguistic tokens to associated terms (including all variations of the respective terms) during indexing of documents using the token database 72. In embodiments, the indexing module 74 of the search system 60 indexes documents from one or more sources (e.g., content databases 64-66). In the process of indexing, the indexing module 74 associates non-linguistic tokens saved in the token database 72 with any instances of the non-linguistic token's associated terms in the documents being indexed. By way of example, during indexing by the indexing module 74, the search system 60 may recognize that the non-linguistic term "ipc" is associated with the term "instrument panel cluster" and its associated variations, and may then map the non-linguistic token "ipc" to all occurrences of the term "instrument panel cluster" and its associated variations in documents being indexed, such that the resultant index 70 includes references to the non-linguistic token "ipc". The search system 60 may utilize existing indexing techniques and tools in the implementation of step 301.

At step 302, the search system 60 receives a term (e.g., a multi-word term) in a search query from a user computer device 62. In aspects, the search module 68 of the user computer device 62 communicates a search query to the search module 76 of the search system 60 through an application program interface (API). Existing search tools and methods may be utilized in the performance of step 302. It should be understood that while multiple terms may be received with a search query, exemplary scenarios herein will be discussed with reference to only one search query term for illustrations sake.

At step 303, the search system 60 determines the non-linguistic token for the term received at step 302 using the token database 72. In aspects, the search module 76 of the search system 60 accesses the token database 72 to obtain a single non-linguistic token associated with the term received in a user's API request (request receive at step 302). In embodiments, the term received in the query is a multi-word term. For example, if the query term "instrument panel cluster" is received by the search system 60, the search system 60 may access the token database 72 and determine that the sole non-linguistic token associated with the term is "ipc". It should be understood that multiple terms may be received with a search query, and the search system 60 may determine the non-linguistic token associated with each term of the query during step 303.

At step 304, the search system 60 performs a query-time expansion to expand the original query to include the non-linguistic token from step 303. The resultant expanded search query includes the term from the original search query, as well as the non-linguistic token determined at step 303. Unlike conventional query-time synonym expansions, step 304 does not expand the original search query to include matching synonyms or variations of the original search query term, but instead expands the search query only with the single non-linguistic token associated with the search query term. The term pairwise expansion as used herein refers to the expansion of a search query received at step 302 with only a single associated non-linguistic token per term (i.e., a multi-word term or a single word term). For example, a pairwise expansion in accordance with step 304 may include an original search query term "instrument panel cluster", along with the sole non-linguistic token "ipc". Thus, a pairwise expansion of the present invention is distinguished from conventional query-time synonym expansions wherein an original search query is expanded to include a plurality of synonyms or variations of every word (e.g., including every word of multi-word terms) in the original search query.

At step 305, the search system 60 conducts a search to generate results based on the expanded search query of step 304. In other words, the search system 60 conducts a search to generate results based on the original query term (original search term) received at step 302, as well as the associated non-linguistic token determined at step 303. In embodiments, the search module 76 of the search system 60 compares the expanded search query with the stored index 70, and returns results or "hits" referencing source documents (matching documents) that match the query term or its associated non-linguistic token. In aspects, this query-time expansion results in a search covering both the user-provided query term and its associated non-linguistic token input by the search system 60.

In embodiments, the search system 60 utilizes existing search tools and methods in the implementation of step 305. For example, the search system 60 may parse an original multi-word query term (original search term) into stemmed tokens and perform a disjunctive search expression among each term. Thus, documents which match any of the stemmed tokens, as well as the non-linguistic token, are considered matches. In aspects, the search system 60 may score documents based on the number of matching tokens (e.g., the more matches the higher the score). For example, the search system 60 may parse the query term "instrument panel cluster" into individual stemmed tokens "instrument", "panel", and "cluster", and may conduct a search based on each token as well as the associated non-linguistic token "ipc". In this way, the search system 60 may determine which indexed documents include matches to the terms "instrument", "panel", "cluster" and "ipc". Since the stored index 70 includes references to "ipc" whenever a variation of the term "instrument panel cluster" is present, the search system 60 generates search results including actual instances of the search query term, as well as search results including instances of recognized variations of the multi-word term "instrument panel cluster"; but does not present search results based on synonyms of each stemmed token "instrument", "panel", and "cluster".

At step 306, the search system 60 provides the search result generated at step 305 to the user, either directly through the search system 60 or through the computer device 62. In aspects, the search module 76 of the search system 60 provides search results referencing source documents matched during step 305 to a user. In aspects, the search module 76 of the search system 60 provides actual source documents matched during step 305 to a user (e.g., via the search system 60 directly or the user computer device 62). For example, the search module 76 may access one or more content databases 64-66 and provide documents to the user computer device 62 based on the search results generated at step 305. In embodiments, existing search tools or methods may be utilized in the implementation of step 306.

The table below illustrates search results for the query term "module instrument panel cl" in accordance with an exemplary use case according to aspects of the invention. In this example, the search system 60 performs a pairwise expansion of the original search query to include the non-linguistic token "ipc", which is associated with the query term "module instrument panel cl" in the token database 72, e.g., in accordance with step 304 of FIG. 3. The search system 60 then finds five (5) matches in the index 70, including four (4) matches to the non-linguistic token "ipc" and one (1) match to the combination of "module instrument panel cl" and the non-linguistic token "ipc", e.g., in accordance with step 305 of FIG. 3. As shown in the column entitled Index-time Expansion, the documents determined to be matched based on the search index (e.g., index 70) include one (1) document containing the variation "instrument panel cluster", one (1) document containing a match to the query term and the non-linguistic token, one (1) document containing the variation "module instrument panel cluster", one (1) document containing the variation "instrument panel cluster", and one (1) document containing the variation "module instrument panel cluster ipc".

TABLE

| Query-Time Expansion to Index-Time Expansion using Non-Linguistic Tokens | | | | |
|---|---|---|---|---|
| Query | Query-time Expansion | Match | Index-time Expansion | Document |
| ". . . module instrument panel cl . . . " | module instrument panel cl, ipc | <== ipc ==> | instrument panel cluster, ipc | " . . . instrument panel cluster . . . " |
| | | module instrument panel cl && <== ipc ==> | module instrument panel cl, ipc | ". . . module instrument panel cl . . . " |
| | | <== ipc ==> | module instrument panel cluster, ipc | " . . . module instrument panel cluster . . . " |

TABLE-continued

Query-Time Expansion to Index-Time Expansion using Non-Linguistic Tokens

| Query | Query-time Expansion | Match | Index-time Expansion | Document |
|---|---|---|---|---|
| | | <== ipc ==> | instrument panel cluster, ipc | " . . . instrument panel cluster . . . " |
| | | <== ipc ==> | module instrument panel cluster ipc, ipc | " . . . module instrument panel cluster ipc . . . " |

FIG. 4 illustrates search results generated during an exemplary conventional query-time synonym expansion. Results from the query-time synonym expansion of FIG. 4 may be contrasted to the pairwise expansion discussed below with reference to FIG. 5.

Benefits of the query-time expansion to index-time expansion of the present invention are more evident after viewing an exemplary search query utilizing a conventional query-time synonym expansion method. In this example, the following terms are recognized by a search engine as variations for the term "instrument panel cluster": "module instrument panel cl", "ipc", "module instrument panel cluster instrument panel cluster", and "module instrument panel cluster ipc". Given a search query of "instrument panel cluster squeaks", a conventional search engine may recognize the multi-term variations of the term "instrument panel cluster", decompose the multi-term synonyms into their respective terms, and search all combinations of the resultant terms (tokens). The resultant conventional query-time synonym expanded search query 400 is illustrated in FIG. 4. The search results returned by a conventional search engine based on the expanded query 400 of FIG. 4 may be coupled with weighting methods (e.g., proximity weight methods), whereby closely adjacent terms are more highly weighted than distant terms. However, such decomposition still returns matches on documents which contain any combination of "panel" and "noise", such as "noisy trim panels" and "cow panels", as well as the target "instrument panel cluster". This explosion of terms becomes particularly troublesome when utilized with a search engine accessing thousands of different source documents, and which recognizes thousands of variations of terms. Such unmanaged synonym expansion begins returning inexplicable matches which quickly become the unfortunate focal point of the search query results.

Figure 5:
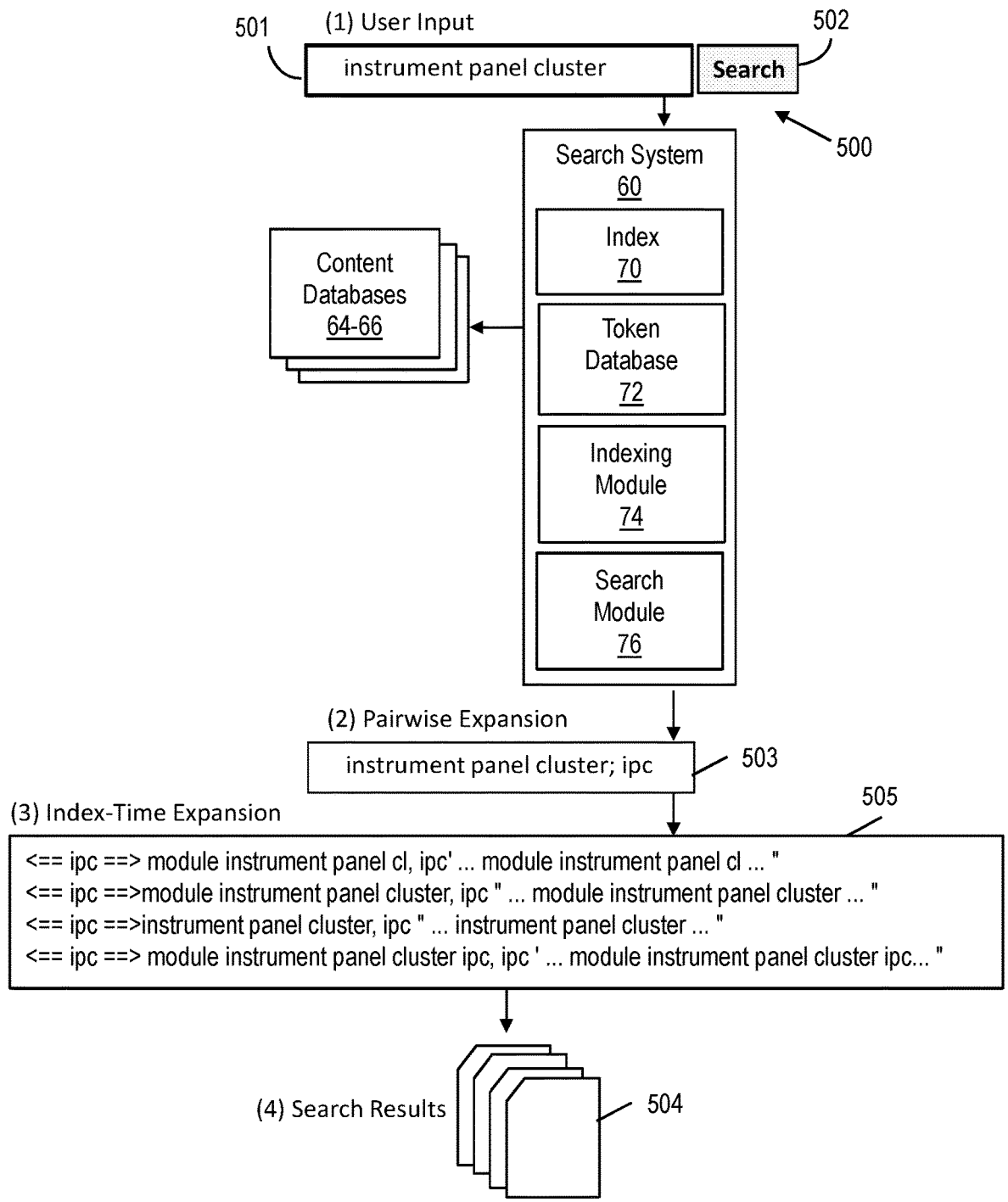
FIG. 5 is a diagram illustrating method steps implemented in an exemplary scenario according to aspects of the invention

FIG. 5 is a diagram illustrating method steps implemented in an exemplary scenario according to aspects of the invention. Steps illustrated in FIG. 5 may be performed in the environment illustrated in FIG. 2, and are described with reference to elements shown in FIG. 2 and the method steps of FIG. 3.

An exemplary user search interface 500 is illustrated in FIG. 5. In the exemplary scenario shown, a user inputs the multi-word term "instrument panel cluster" into the search window 501 of the user search interface 500 of the user computer device 62, and sends the query to the search system 60 via initiation of the search button 502. The search system 60 receives the search query term "instrument panel cluster" in accordance with step 302 of FIG. 3, and determines that the non-linguistic token "ipc" is associated with the query term based on association information stored in the token database 72, in accordance with step 303 of FIG. 3. The search system 60 then initiates a pairwise expansion in accordance with step 304 of FIG. 3, wherein the search query "instrument panel cluster" is expanded to include "instrument panel cluster" and "ipc" as indicated at 503. A search is then conducted by the search system 60 based on the expanded search query or pairwise expansion 503 (i.e., both the query term "instrument panel cluster" and the non-linguistic token "ipc") in accordance with step 305 of FIG. 3. In this way, the search system 60 uses only pairwise expansion, where the original multi-word search query term pairs only to a single non-linguistic token "ipc". The search results 504 incorporate results for the following pair-wise combinations based on the index-time expansion: instrument panel cluster, ipc; module instrument panel cl, ipc; module instrument panel cluster, ipc; instrument panel cluster, ipc; and module instrument panel cluster ipc, ipc. In this example, each of the pairwise synonyms and/or variations maps a highly compound word to a single non-linguistic acronym ("ipc") which is very unlikely to cause unintended search matches.

It should be noted that, in embodiments, no variations or synonyms of the query term "instrument panel cluster" are added to the search logic in accordance with step 305 of FIG. 3. Compare, for example, the query-time synonym expansion 400 of FIG. 4 with the pairwise expansion 503 of FIG. 5. In aspects, index-time expansion (indicated at 505) of the present invention occurs as a result of the mapping of non-linguistic tokens to the index 70 at step 301. In other words, search logic of the pairwise expansion 503 does not include the parsed terms of variations of the query term "instrument panel cluster", such that the search logic is not expanded to include possible matches to terms that are not actually relevant to the user. Instead, matches to variations of the query term "instrument panel cluster" occur through the search system 60 detecting the non-linguistic token "ipc" in the index, wherein the non-linguistic token is associated with instances of variations of the query term "instrument panel cluster" in matched documents, such as "module instrument panel cl", "module instrument panel cluster", and "module instrument panel cluster ipc". Thus, the search system 60 in this example utilizes the pairwise combinations listed above to match documents which contain any of the pairwise combinations because both the query and the document are synonymously indexed to the shared non-linguistic term (token) "ipc".

In embodiments, with the non-linguistic tokens serving to "glue" documents to search queries, an additional augmentation may be applied during formal concept analysis (FCA) by copying non-linguistic terms into a "keyword field" resident on the document initially loaded into a search engine (e.g., Solr search engine) before indexing of the document. In embodiments, the "keyword field" is resident on the document JavaScript object notation (json). This additional expression of the non-linguistic keywords in an auxiliary search engine field helps to overcome the down-weighting that the search engine may apply to synonym terms alone. That is, a search engine may value matches of synonyms less highly than matches of original terms, yet the synonym match may need higher weighting, not less, for more accurate results. The actual representation of the non-linguistic keyword terms in an auxiliary search engine field (e.g., Solr field) helps overcome the reluctance of the search engine to provide matches which are synonym only matches.

In embodiments, the auxiliary search engine field (e.g., Solr field) may be leveraged further as a filter query, thereby restricting the document retrieval set to documents which assuredly contain at least a direct mention to the key components referenced in the query. With the benefit of the query-time synonyms, construction of the additional filter query is as simple as including the full user query as an additional component in the search engine API call (e.g., "&fq=keywords:(the instrument panel cluster has a rattle . . . )"), as it is not necessary to manually resolve the non-linguistic acronyms and the search engine can rely upon the search system query-time synonyms to perform this task. In embodiments, the search system 60 comprises a filter query requiring a match between the expanded search query 503 and a secondary text field (not shown) containing one or more non-linguistic tokens of one or more documents (i.e., documents saved in one of the content databases 64-66 and indexed by the search system 60). In these embodiments, the search system 60 performs a filtering of results by matching the expanded search query 503 with the secondary text field containing one or more non-linguistic tokens of one or more documents of the search results.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still another embodiment, the invention provides a computer-implemented method for generating search results based on non-linguistic token. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating search results based on pre-defined non-linguistic tokens, comprising:
    accessing, by a computing device, a token database including a multi-word term and a sole matching pre-defined non-linguistic token, wherein the pre-defined non-linguistic token is associated with variations of the multi-word term;
    mapping, by the computing device, the pre-defined non-linguistic token to the variations of the multi-word term in documents during indexing based on associations in the token database between the pre-defined non-linguistic token and the variations of the multi-word term;
    receiving, by the computing device, the multi-word term in a search query; determining, by the computing device, the pre-defined non-linguistic token associated with the multi-word term using the token database;
    performing, by the computing device, a query time pair-wise expansion of the search query that pairs the multi-word term with only the pre-defined non-linguistic token to generate an expanded search query containing the multi-word term and the pre-defined non-linguistic token;
    parsing, by the computing device the multi-word term into individual terms;
    comparing, by the computing device, the multi-word term, the individual terms, and the pre-defined non-linguistic token to a stored index to determine matching documents; and
    generating, by the computing device, search results based on the matching documents.

2. The method of claim 1, further comprising mapping, by the computing device, the pre-defined non-linguistic token to the variations of the multi-word term, and saving resulting associations in the token database.

3. The method of claim 1, further comprising determining, by the computing device, the pre-defined non-linguistic token based on the multi-word term, wherein the pre-defined non-linguistic token is an acronym of the multi-word term.

4. The method of claim 1, wherein the search query is received from a remote user computer device via an application programming interface (API) request.

5. The method of claim 1, further comprising copying, by the computing device, the pre-defined non-linguistic token into a keyword field of the documents prior to indexing of the documents.

6. The method of claim 1, further comprising filtering the search results by matching, by the computing device, the expanded search query with a secondary text field containing one or more pre-defined non-linguistic tokens of one or more documents of the search results.

7. The method of claim 1, further comprising:
    ranking, by the computing device, the matching documents based on rules,
    wherein the generating the search results comprises generating ranked search results based on the ranking of the matching documents.

8. A computer program product for generating search results based on pre-defined non-linguistic tokens, the computer program product comprising a computer readable storage medium having program instructions embodied therewith, the program instructions executable by a computing device to cause the computing device to:

access a token database including a multi-word term and a sole matching pre-defined non-linguistic token, wherein the pre-defined non-linguistic token is associated with variations of the multi-word term;

map the pre-defined non-linguistic token associated with the multi-word term to a plurality of documents during indexing based on associations in the token database between the pre-defined non-linguistic token and the multi-word term;

receive a search query comprising one or more original search terms including the multi-word term;

determine the pre-defined non-linguistic token associated with the the multi-word term of the one or more original search terms using the token database;

perform a query time pairwise expansion of the search query to generate an expanded search query that pairs the multi-word term with only the pre-defined non-linguistic token to generate an expanded search query containing the multi-word term and the pre-defined non-linguistic token;

parse the multi-word term into individual terms;

compare the multi-word term, the individual terms, and the pre-defined non-linguistic token to a stored index to determine matching documents; and generate search results based on the matching documents.

9. The computer program product of claim 8, wherein the program instructions further cause the computing device to map the pre-defined non-linguistic token to the variations of the multi-word term, and save the resulting associations in the token database.

10. The computer program product of claim 8, wherein the program instructions further cause the computing device to create, prior to indexing, one of the plurality of pre-defined non-linguistic tokens associated with the multi-word term, wherein the pre-defined non-linguistic token is an acronym of the multi-word term.

11. The computer program product of claim 8, wherein the program instructions further cause the computing device to copy the pre-defined non-linguistic token into respective keyword fields of the plurality of documents prior to indexing of the plurality of documents.

12. The computer program product of claim 11, wherein the program instructions further cause the computing device to filter the search results by matching the expanded search query with a secondary text field containing one or more pre-defined non-linguistic tokens located in keyword fields of one or more documents of the search results.

13. The computer program product of claim 11, further comprising:

ranking the matching documents based on saved rules, wherein the generating the search results comprises generating ranked search results based on the ranking of the matching documents.

14. An enterprise search engine system for generating search results based on pre-defined non-linguistic tokens, comprising:

a CPU, a computer readable memory and a computer readable storage medium associated with a computing device;

program instructions to copy a plurality of pre-defined non-linguistic tokens associated with respective multi-word terms and their variations into respective keyword fields of a plurality of documents prior to indexing of the plurality of documents;

program instructions to access a token database including the pre-defined non-linguistic tokens and their associated multi-word terms, wherein each of the multi-word terms is associated with a single one of the plurality of pre-defined non-linguistic tokens;

program instructions to map the plurality of pre-defined non-linguistic tokens to the plurality of documents during indexing based on associations in the token database between the plurality of pre-defined non-linguistic tokens and the multi-word terms and their variations located in the plurality of documents;

program instructions to receive a search query comprising one or more original search terms including a first multi-word term of the multi-word terms;

program instructions to determine one of the plurality of pre-defined non-linguistic tokens associated with the first multi-word term of the one or more original search terms using the token database;

program instructions to perform a query time pairwise expansion of the search query that pairs the first multi-word term with the one of the plurality of pre-defined non-linguistic tokens associated with the first multi-word term to generate an expanded search query containing the first multi-word term and the one of the plurality of pre-defined non-linguistic tokens associated with the first multi-word term program instructions to parse the first multi-word term into individual terms;

program instructions to compare the first multi-word term, the individual terms, and the one of the plurality of pre-defined non-linguistic tokens associated with the first multi-word term to a stored index to determine matching documents; and program instructions to generate search results based on the matching documents, wherein the search results comprise matching documents that include one or more of the plurality of documents containing the one of the plurality of pre-defined non-linguistic tokens associated with the first multi-word term, and wherein the program instructions are stored on the computer readable storage medium for execution by the CPU via the computer readable memory.

15. The enterprise search engine system of claim 14, further comprising program instructions to map the plurality of pre-defined non-linguistic tokens to the variations of the multi-word terms, and save resulting associations in the token database.

16. The enterprise search engine system of claim 14, wherein the system further comprises program instructions to create, prior to indexing, at least one of the plurality of pre-defined non-linguistic tokens associated with the at least one of the multi-word terms, wherein the at least one of the plurality of pre-defined non-linguistic tokens is a non-standard acronym of the at least one of the multi-word terms.

17. The enterprise search engine system of claim 14, ranking the matching documents based on saved rules, wherein the generating the search results comprises generating ranked search results based on the ranking of the matching documents.

18. The enterprise search engine system of claim 14, wherein the search query is received via an application programming interface (API) request.

19. The enterprise search engine system of claim 18, further comprising:
   program instructions to obtain the matching documents based on the search results; and
   forward the search results to the remote user computer device.

\* \* \* \* \*